United States Patent
Desgrousilliers

[19]

[11] Patent Number: 5,881,239
[45] Date of Patent: Mar. 9, 1999

[54] NETWORK SYSTEM WITH RESILIENT VIRTUAL FAULT TOLERANT SESSIONS

[75] Inventor: Marc Desgrousilliers, Campbell, Calif.

[73] Assignee: Tandem Computers Incorporated, Cupertino, Calif.

[21] Appl. No.: 924,466

[22] Filed: Aug. 21, 1997

Related U.S. Application Data

[63] Continuation of Ser. No. 377,128, Jan. 23, 1995, abandoned.

[51] Int. Cl.[6] ................................................ G06F 13/00
[52] U.S. Cl. ............................ 395/200.58; 395/200.75; 395/182.02
[58] Field of Search ........................ 395/200.58, 200.5, 395/200.75, 200.8, 684, 182.02, 200.51

[56] References Cited

U.S. PATENT DOCUMENTS

| | | | |
|---|---|---|---|
| 4,458,311 | 7/1984 | Clements et al. | 395/200.1 |
| 4,586,134 | 4/1986 | Norstedt | 395/200.1 |
| 4,969,092 | 11/1990 | Shorter | 395/200.1 |
| 4,975,914 | 12/1990 | Ashton et al. | 371/11.2 |
| 5,027,269 | 6/1991 | Grant et al. | 395/200.12 |
| 5,241,594 | 8/1993 | Kung | 380/4 |
| 5,426,773 | 6/1995 | Chabanet et al. | 395/575 |
| 5,559,957 | 9/1996 | Balk | 395/182.21 |

*Primary Examiner*—Zarni Maung
*Attorney, Agent, or Firm*—Graham & James LLP

[57] ABSTRACT

In a distributed network system, resilient virtual fault tolerant service sessions are conducted between a host application program and a telnet client user over an end-to-end link including a telnet server, a messaging protocol process, a network driver, and a communication link. The telnet server establishes a tty type structure in response to a service request from a telnet user/client. This invention includes a service control block which controls the establishment of a tty and associated request control blocks and buffers for processing I/O requests. The session is functionally partitioned into an upper half session involving the host application program and the telnet server, and a lower half session involving the remainder of the network components leading to the telnet client. When an interruption in a session occurs due to a fault originating in those portions of the network devoted to the lower half session, the telnet server continues to operate the upper half session by accepting I/O requests from the host application program and queueing these requests in the request control buffers, up to a maximum number of permitted queued requests. The host file system determines the handling of requests that exceed the maximum.

23 Claims, 8 Drawing Sheets

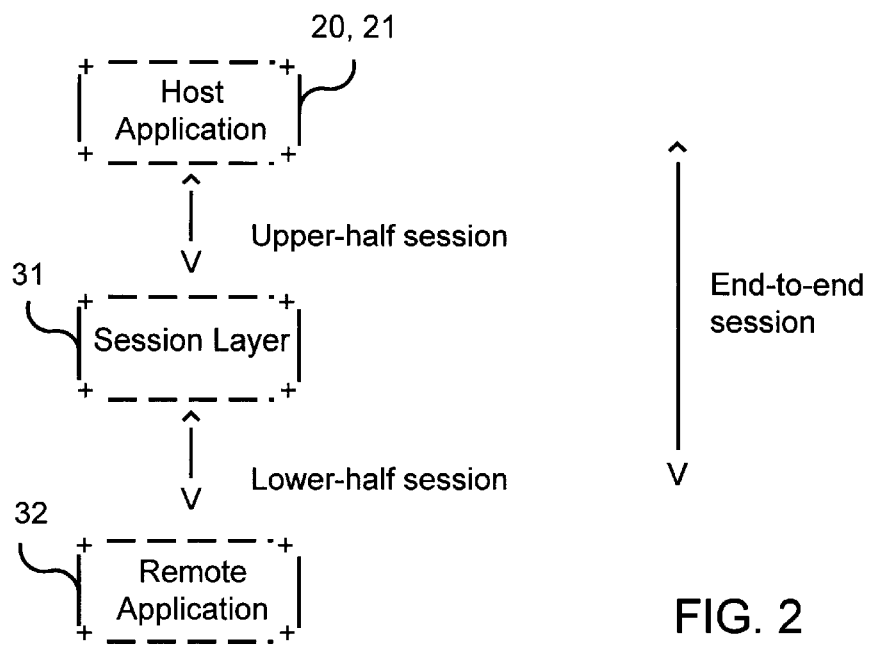
FIG. 2
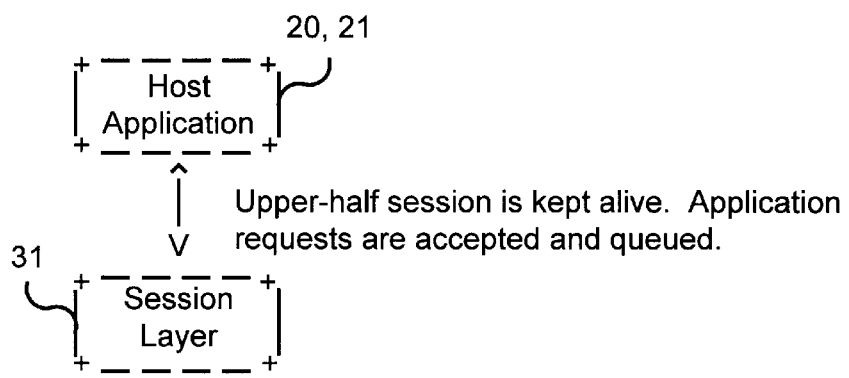
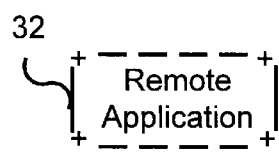
FIG. 3

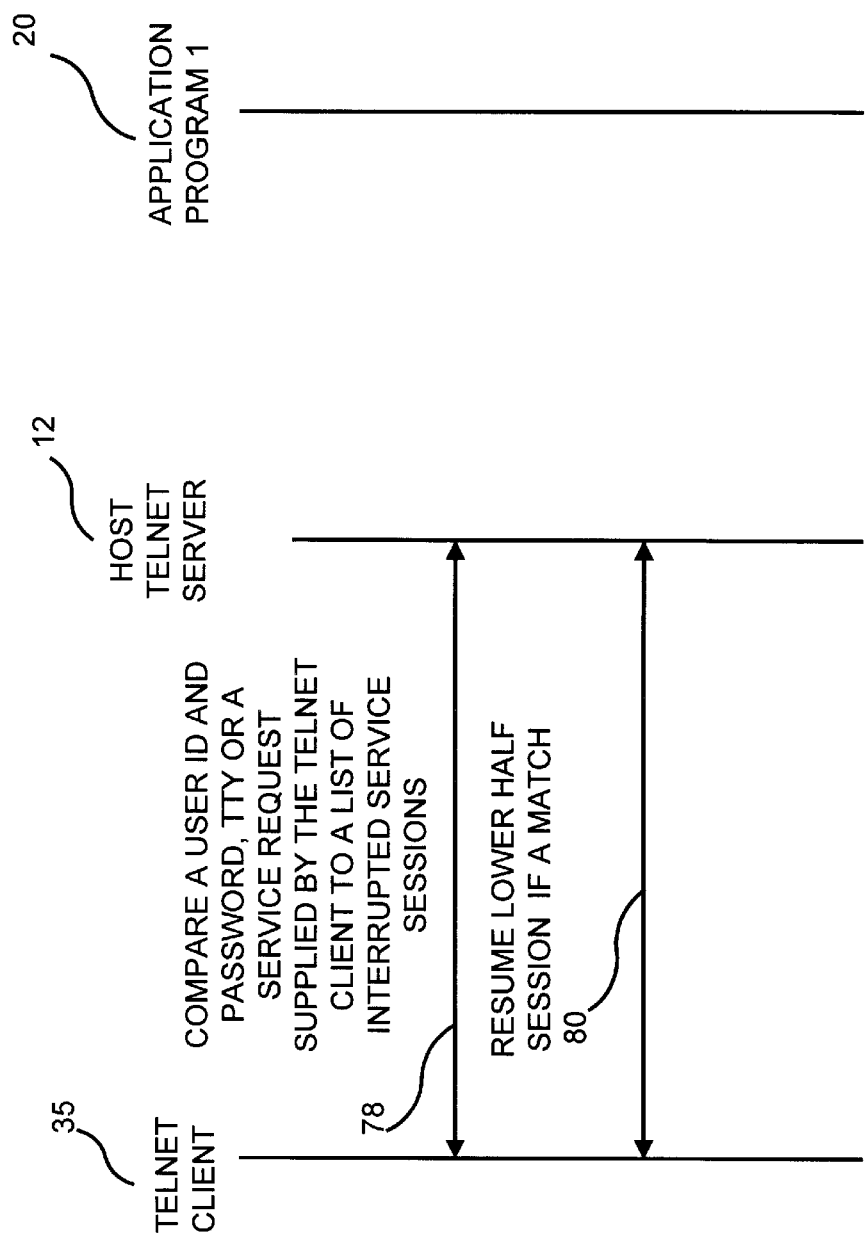

NETWORK SYSTEM WITH RESILIENT VIRTUAL FAULT TOLERANT SESSIONS

This application is a continuation of application Ser. No. 08/377,128 filed Jan. 23, 1995, now abandoned.

BACKGROUND OF THE INVENTION

This invention relates to distributed network systems in which a host computer is linked to a plurality of clients over a network for information interchange.

Systems are known in which a host computer is linked to a plurality of system clients over a network. In a typical configuration, a host server, termed a telnet server herein, is linked to a plurality of telnet clients via a multi-branch local or wide area network using the telnet protocol. At the host end of the system, the telnet server is coupled to the network via a transmission control protocol/internet protocol (TCP/IP) process which provides information transport services; while at each telnet client site a client is coupled to the network via a similar TCP/IP process. The telnet server functions to note requests for specified services from telnet clients and to service those requests. A plurality of application programs are provided at the host installation, and appropriate ones of these programs are selectively coupled to the telnet server in response to telnet client requests.

The procedure whereby a point-to-point link is established and information is exchanged between a host application and a telnet client application is termed a session, and a session typically commences by the generation of a service request by a telnet client at a client workstation. In response to the receipt of a request for service, the telnet server establishes a memory structure using host system memory for controlling the service procedure and for retrieving, storing and forwarding information pertaining to the request for service. For example, in a unix based system, the telnet server establishes atty unix structure and associated control buffers in response to the receipt of a request for a session. Typically, an authentication routine is initially called to determine whether the telnet client requester is authorized to participate in the requested service, with the routine typically providing the client user ID and password at the client workstation which is then checked by the telnet server at the host installation using an authentication application program routine. After the requester has been cleared by the authentication routine, the service requested is carried out in conjunction with the appropriate one or more application programs. Once the service is completed, the session is terminated.

During a session, either hardware or software failures (or both) can occur at the host location, at the client location or over the physical link therebetween. When such a failure occurs, the results of all session processing up until the time of failure are lost, and the session must be restarted from the beginning. This loss of session processing results is undesirable since valuable processing time is wasted and since the network must now be reoccupied for that additional length of time required to achieve that same stage in the service session prior to interruption of the link.

SUMMARY OF THE INVENTION

The invention comprises a method and system for providing resilient virtual fault tolerant sessions whereby the results of partially completed processes during a session can be saved and successive requests from the host application program can be queued after interruption of a link so that the session can be resumed at the point of failure once the link between the host and the remote application is reestablished.

From a process standpoint, the invention comprises a method of conducting a resilient session in a network system having a host system with a host computer, a plurality of host application programs for providing service routines, a host telnet server for supervising service requests, a communications protocol process for providing information transport services between the host telnet server and a client, and a plurality of telnet client sites each having a workstation and a communications protocol process for providing information transport services between the telnet client site and the network, the method including the steps of receiving a service request from a telnet client, establishing an end-to-end link between the requesting telnet client site and at least one application program, performing the service request as an upper half session involving the one or more application programs and the host telnet server and a lower half session involving the host telnet server and those portions of the network system extending between the host telnet server and the requesting telnet client, detecting an interruption in the end-to-end link in the network system portions involved in the lower half session, using the host telnet server to continue the upper half session until the end-to-end link is reestablished, and resuming the lower half session of the interrupted service session at the interrupted stage.

The step of establishing or reestablishing the end-to-end link preferably includes the step of performing a user authentication routine before performing the service request.

The step of performing the service request preferably includes the step of establishing request control buffers for host application requests; and the step of using the host telnet server preferably includes the step of queueing host application requests in the request control buffers until the end-to-end link is reestablished. Once the end-to-end link is reestablished, the method proceeds by sending the queued host application requests to the telnet client for processing.

The step of resuming preferably includes the step of performing a user authentication routine prior to resuming the lower half session of the interrupted service request session. The user authentication routine is optionally performed by either comparing a user ID and password, tty or a service request supplied by the telnet client with a list of interrupted service sessions, and permitting the session to resume if a match is found.

From an apparatus standpoint, the invention comprises an improvement in a network system having a host site with a host computer, a plurality of host application programs for providing service routines, a host telnet server for supervising service requests, a communications protocol process for providing information transport services between the host telnet server and a network; and a plurality of telnet client sites each having a workstation and a communications protocol process for providing information transport services between the telnet client site and the network. The host telnet server includes means for receiving a service request from a telnet client, means responsive to receipt of a service request for establishing an end-to-end link between a requesting telnet client site and at least one host application program, and means for performing a service session involving the requesting telnet client and at least one host application program. The improvement comprises means in the host telnet server for functionally partitioning a service session into an upper half session involving the at least one application program and the host telnet server and a lower half session involving those portions of the network system extending between the host telnet server and the requesting telnet client, means for detecting an interruption in the end-to-end link in the network system portion involved in the lower half session, means for continuing the upper half session until the end-to-end link is reestablished, and means for resuming the lower half session of the interrupted service session at the interrupted stage.

The host telnet server preferably includes means for establishing request control buffers for host application requests, and means for queueing host application requests in the request control buffers until the end-to-end link is reestablished. The host telnet server further preferably includes means for sending the queued host application requests to the telnet client when the lower half session of the interrupted service session is resumed.

The resuming means preferably includes means for performing a user authentication routine prior to resuming the lower half session of the interrupted service session. In one embodiment, the host telnet server includes means for establishing a tty list for service requests; and means for performing a user authentication routine includes means for comparing the name or ID of a tty identified by the telnet client with the current list, and means for permitting the service session to resume if a match is found. In an alternate embodiment, the host telnet server includes means for establishing a list of interrupted service sessions; and means for performing a user authentication routine includes means for comparing a service request received from the telnet client with the list of services, and means for permitting the service session to resume if a match is found.

Since an interrupted service session can resume from the stage completed just before the link interruption occurred, the processing results achieved during the partially completed session are not wasted, with an attendant savings in processing time, network occupancy time, and the costs associated therewith. Moreover, the invention can be readily implemented with existing host installations at low cost or can be designed into new systems.

For a fuller understanding of the nature and advantages of the invention, reference should be had to the ensuing detailed description taken in conjunction with the accompanying drawings.

BRIEF DESCRIPTION OF THE DRAWINGS

FIGS. 2–4 are schematic diagrams illustrating the operation of the invention.

FIG. 9 shows a diagram of the step of user authentication in the network system of FIG. 1.

DETAILED DESCRIPTION OF THE PREFERRED EMBODIMENTS

Figure 1:
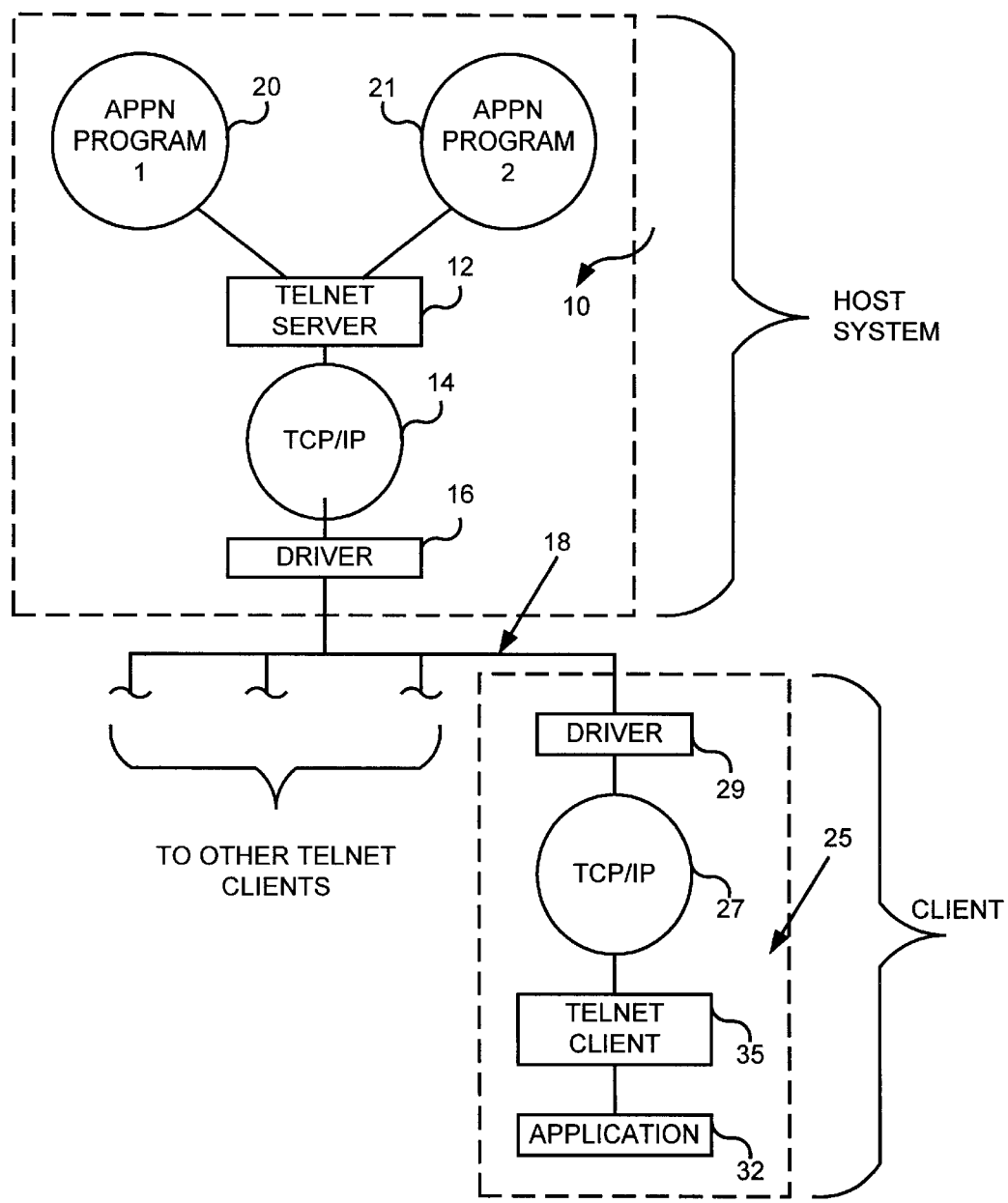
FIG. 1 is a schematic diagram of a network system incorporating the invention.

Turning now to the drawings, FIG. 1 is a schematic diagram of a network system incorporating the invention. As seen in this figure, a host installation generally designated with numeral 10 includes a telnet server 12, a transmission control protocol/internet process 14, and a network driver 16 coupled to a plurality of branches of a distributed network generally designated with reference numeral 18. A plurality of application programs 20, 21 (only two are illustrated) are provided at the host installation 10 and are selectively invoked in response to specific requests for service.

Coupled to the remote ends of network 18 are a plurality of client installations, one of which is illustrated and designated with reference numeral 25. Each client installation 25 includes a workstation, which may comprise an IBM compatible PC, an Apple PC or the like, a TCP/IP process 27, a local area network driver 29, a telnet client 35, and an application 32.

Telnet server 12 preferably comprises a Tandem Computers TELSERV telnet server. TCP/IP 14 comprises a software unit for providing transmission control protocol/network protocol processing for information flowing between the telnet server 12 and the client network protocol 27. LAN driver 16 preferably comprises a Tandem Computers TLAM or X25AM Subsystem. Application programs 20, 21 may comprise any one of a number of application programs for providing requested services to telnet clients, such as mail services, payroll or other accounting services, statistical usage service or the like.

Telnet server 12 supervises and controls all service requests generated by telnet clients and host application I/O requests and incorporates the functional capability of providing resilient virtual fault tolerant sessions in accordance with the invention.

FIGS. 6–9 shows a method for providing resilient virtual fault tolerant sessions.

Figure 6:
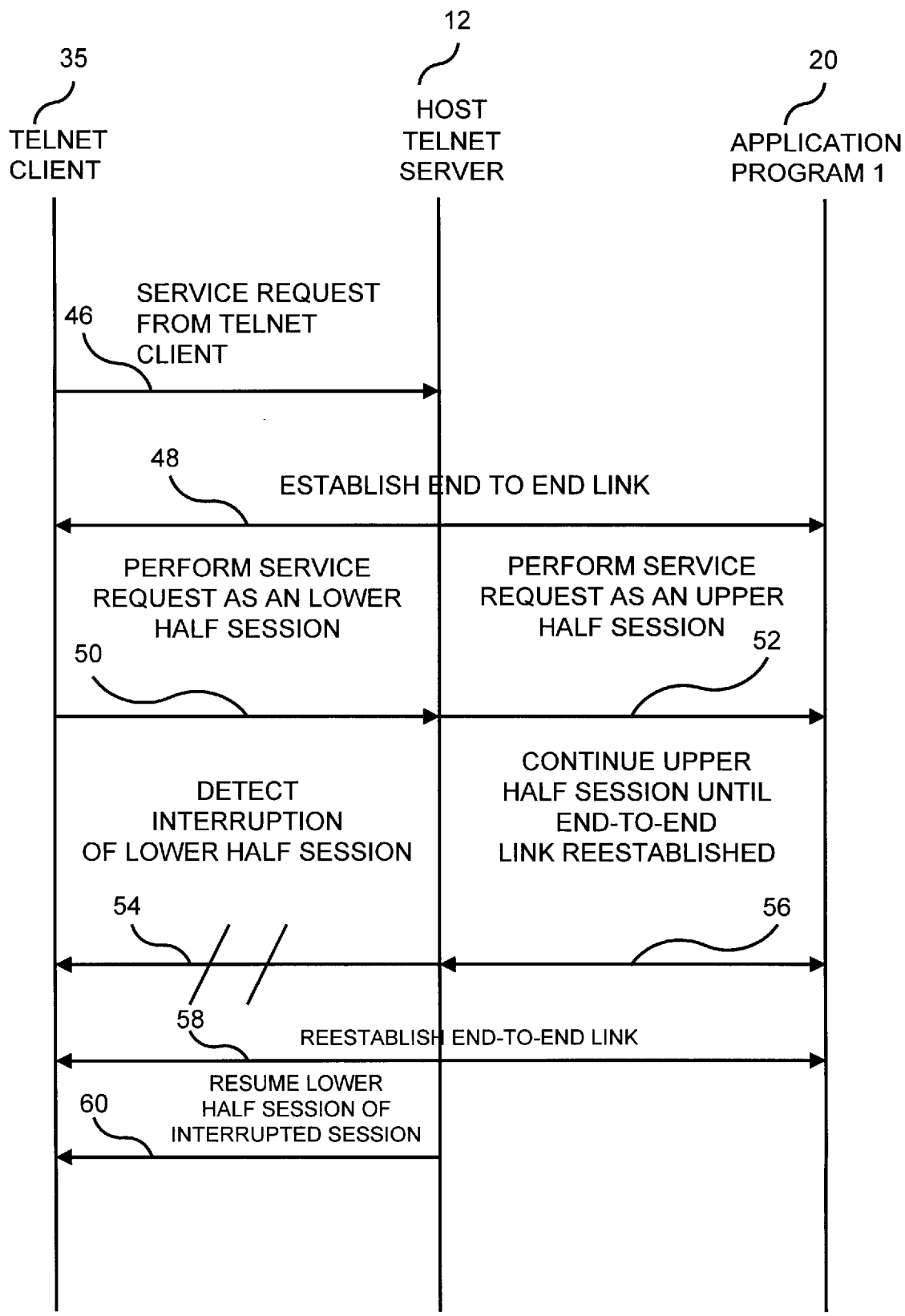
FIG. 6 shows a diagram of the method of resilient virtual tolerant sessions in network system of FIG. 1.

FIG. 6 shows an overall method of resilient fault tolerant sessions. The resilient fault tolerant session is a method including: step 46 of receiving a service request from a telnet client 35, step 48 of establishing an end-to-end link between the requesting telnet client site 25 and at least one application program 20, step 52 of performing the service request as an upper half session involving the one or more application programs 20 and the host telnet server 12, and step 50 of performing a lower half session involving the host telnet server 12 and those portions of the network system extending between the host telnet server 12 and the requesting telnet client 35, step 54 of detecting an interruption in the end-to-end link in the network system portions involved in the lower half session of step 50, step 56 of using the host telnet server 12 to continue the upper half session until the end-to-end link is reestablished in step 58 (see FIG. 7), and step 60 of resuming the lower half session of the interrupted service session at the interrupted stage.

Figure 7:
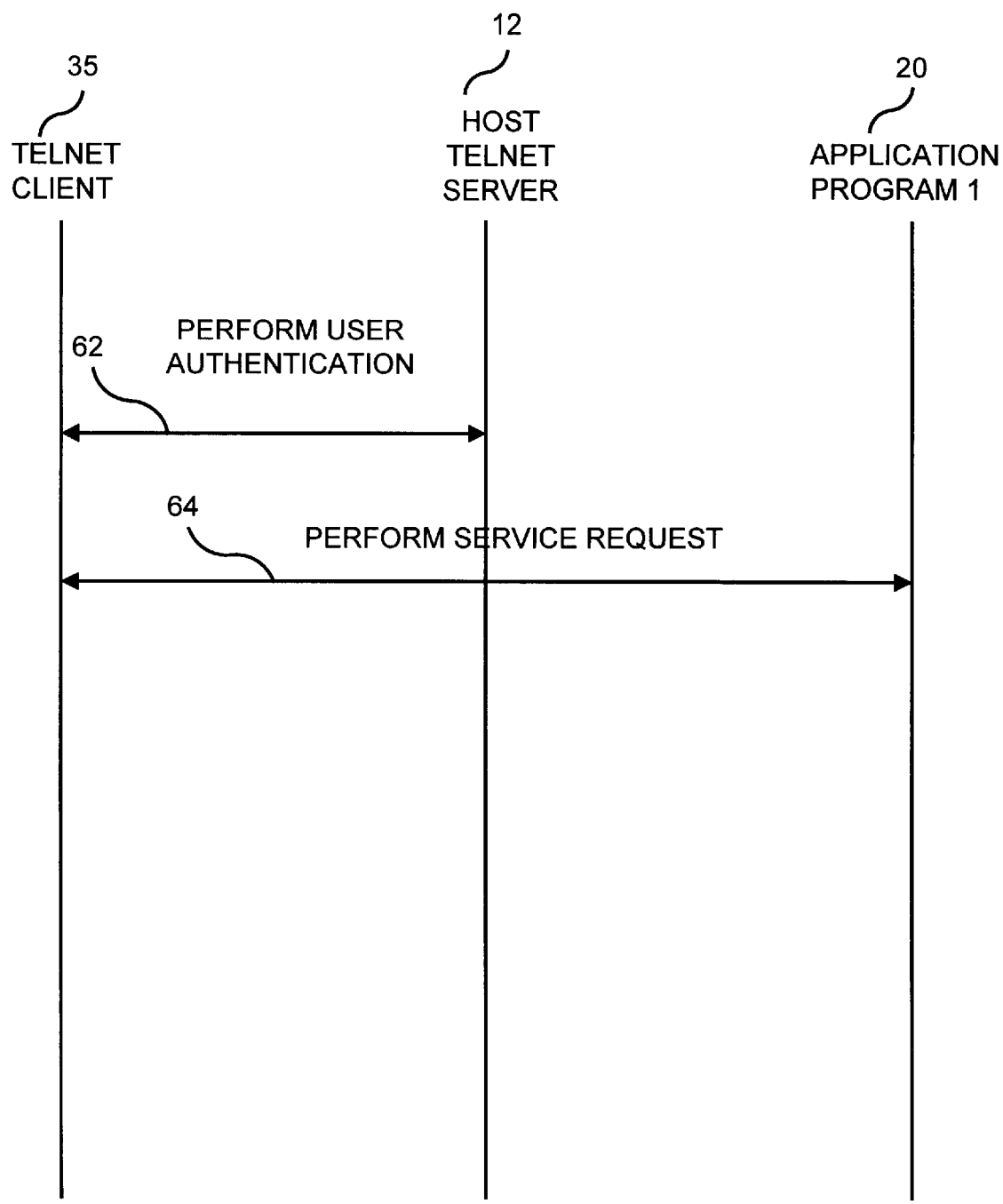
FIG. 7 shows a diagram of the step of reestablishing an end to end link in the network system of FIG. 1.

FIG. 7 shows step 58 of establishing or reestablishing the end-to-end link preferably includes step 62 of performing a user authentication routine before performing the service request 64.

Figure 8:
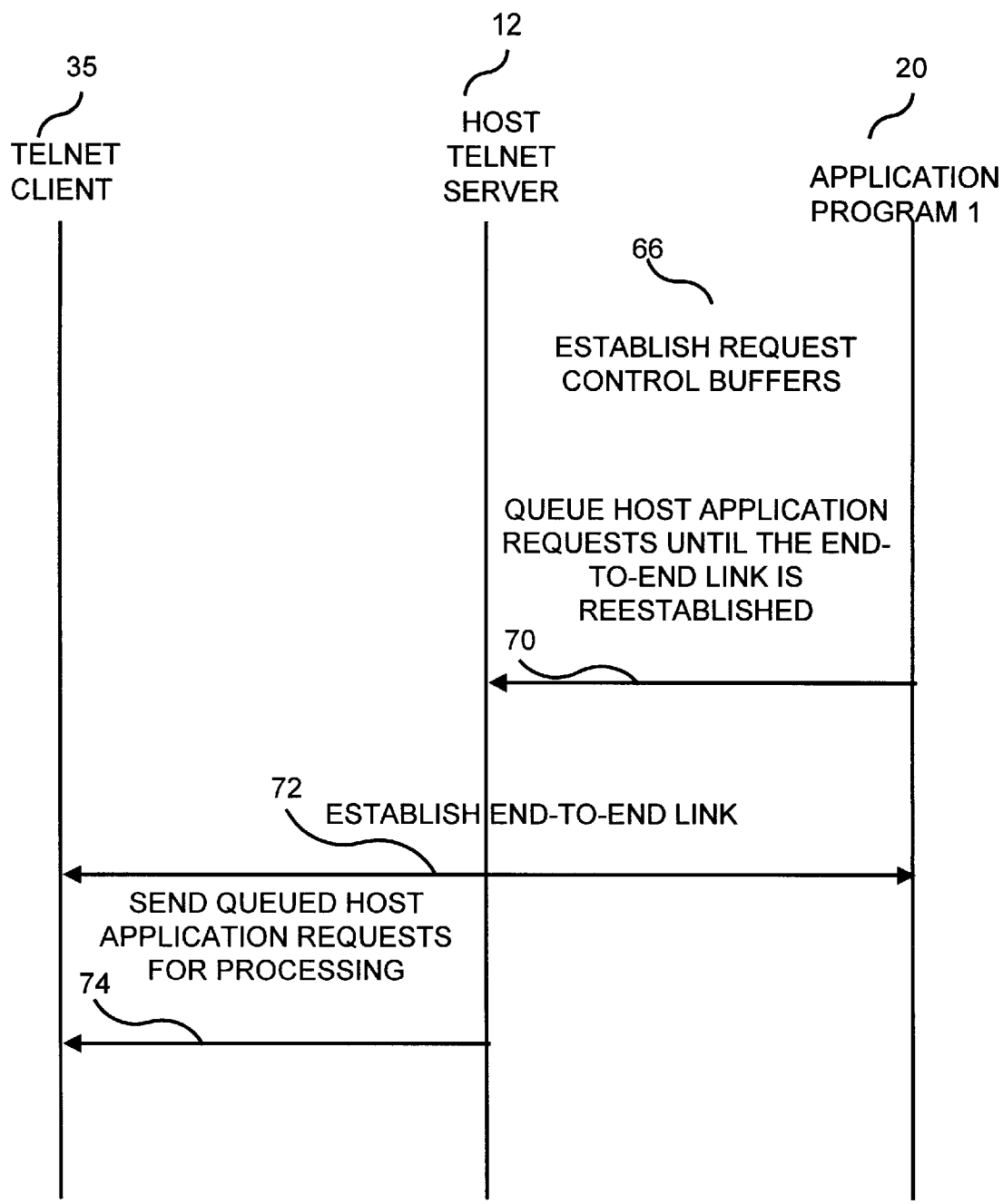
FIG. 8 shows a diagram of the step of performing a service request in the network system of FIG. 1.

FIG. 8 shows steps 64 for performing the service request which preferably includes step 66 of establishing request control buffers for host application 20 requests; and of using the host telnet server 12 to preferably queue in step 70 host application 20 requests of the host application until in step 72 the end-to-end link is reestablished. Once the end-to-end link is reestablished in step 72, the queued host application in step 74 sends requests the telnet client for processing.

FIG. 9 shows resuming the lower half session of the interrupted session that preferably includes performing a user authentication routing prior to resuming the lower half session of the interrupted service request session. The user authentication routine of step 76 is optionally performed by comparing either in step 78 a user ID and password, tty or a service request supplied by the telnet client with a list of interrupted service sessions, and permitting the session to resume in step 80 if a match is found.

Figure 4:
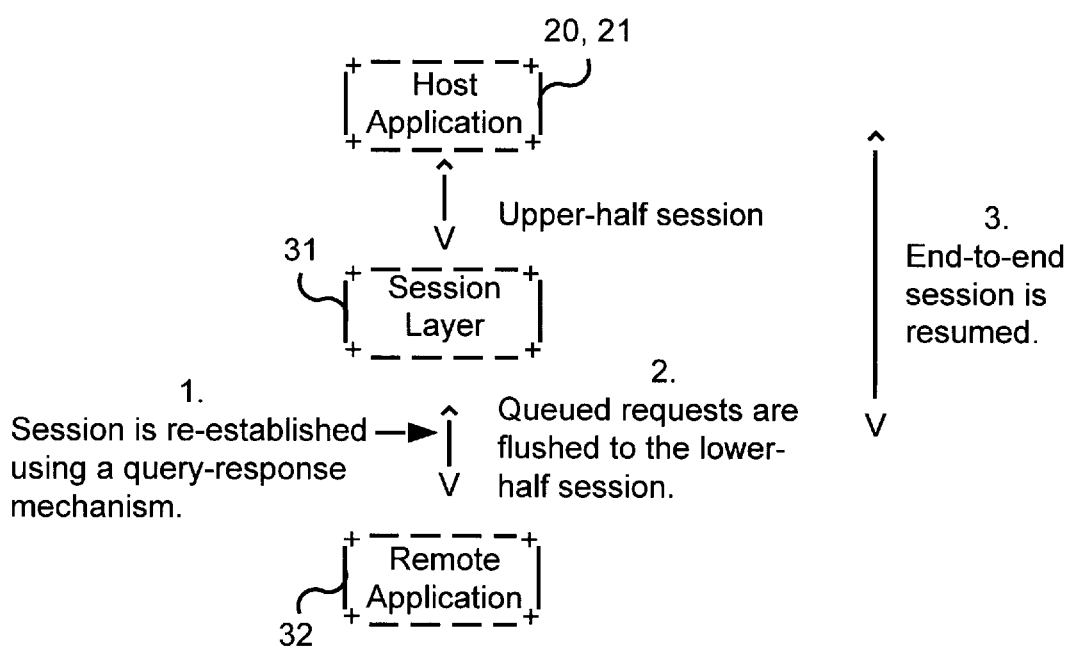

FIGS. 2–4 schematically illustrate the manner in which the invention operates to provide resilient virtual tolerant sessions.

FIG. 2 shows a normal session in process. As seen in this figure, a point-to-point (or end-to-end) session is functionally partitioned into an upper half session involving interaction between a host application (such as applications 20, 21 of FIG. 1) and the session layer 31 within the telnet server 12; and a lower half session involving interaction between the session layer and the remote application at the client installation 25. The link between the session layer 31 and the remote application 32 includes the TCP/IP process 14, LAN driver 16, network 18 and telnet client installation 25 (FIG. 1). As shown in FIG. 3, when a failure occurs anywhere in the network from TCP/IP process 14 to telnet client site 25, the lower half session is lost; however, the upper half session continues as if the network failure had not occurred and requests from host applications 20, 21 are accepted and queued by telnet server 12 in the session layer 31. As shown in FIG. 4, when the link is reestablished between session layer 31 and remote application 32, the original session is first reestablished using an appropriate authentication routine (such as a query-response mechanism), and the requests queued in the upper half session are passed to the lower half session and processed, usually in FIFO fashion. Thus, when the session is resumed in the manner indicated in FIG. 4, unprocessed requests from the upper half session are available for immediate processing in the lower half session and the session can be completed from the interrupted stage.

Figure 5:
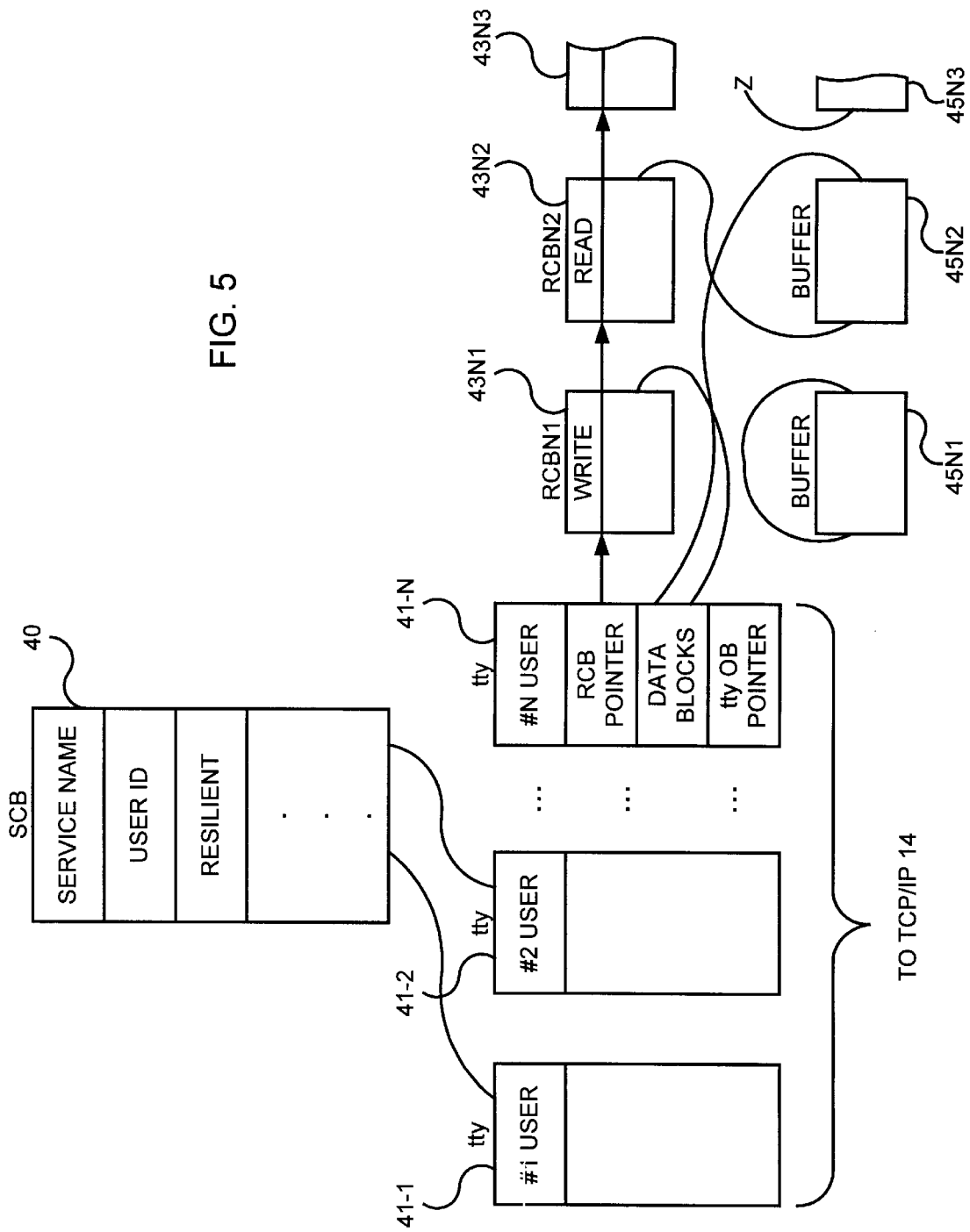
FIG. 5 is a schematic block diagram illustrating the request queueing of the host application program requests.

FIG. 5 illustrates the structures established by telnet server 12 in response to a request for service from a telnet client installation 25. In response to such a request, a service control block 40 establishes a tty such as tty 41-1, 41-2, . . . , 41-N for the telnet client user. Service control block 40 contains information specific to the service request, such as the name of the service, the user ID, whether or not the requested service session has the resilient attribute of the invention, the local file name of the initial program to be launched when a session is established, a local volume name to use for the program swap file, a local library file name to be used to launch the initial program, and other information not necessary to an understanding of the invention. Once the application program is launched, telnet server 12 supervises and controls the establishment of request control blocks, such as the write request control block 43N1 and read request control block 43N2 associated to tty 41-N. Each request control block controls an associated buffer, such as buffers 45N1 and 45N2. I/O requests from the application program are stored in the request control blocks associated with a given tty in the usual way in a unix type structure. Operation of the session proceeds normally until the end-to-end link is lost, or the session terminates.

If the link failure occurs anywhere in the system along the lower half session (i.e., the TCP/IP process 14, driver 16, network 18 or telnet client installation 25), and if the session is designated as a resilient session in service control block 40, operation of the upper half session is permitted to proceed as if no failure had occurred: i.e., the application program is not informed of the failure. Consequently, I/O requests from the application program 20, 21 are still received, processed by telnet server 12 and stored in the request control buffers associated to the tty dedicated to the interrupted service session. The request control buffers are linked together in serial fashion to form a queue in which the individual requests are saved.

Once the end-to-end link is reestablished, the telnet client proceeds by either identifying the tty which was previously established for the service session (if the tty identity is known to the client) or requests the same service and furnishes the user ID and password. In the former case, the tty identification supplied by the telnet client is compared with a list of ttys established by the host telnet server 12 and the session is permitted to resume if a match is found. In the latter case, the telnet server 12 compares the requested service with a list and determines whether the requested service matches that of a previously requested and partially performed service session. Once the match is made, telnet server 12 permits the session to resume at the interrupted process stage, and all queued host application program requests in the request control buffers are sent to the telnet client 25 to continue the session that was established prior to the lower half session failure.

It should be noted that there is a maximum number of outstanding requests permitted for a given application program, which is limited by the type of file system employed. For example, for a Tandem Computers system, this maximum number is 15, while in a unix system, this maximum number is 1. If this maximum number is reached, the file system employed either prevents issuing new requests or reject them.

Appendix A is a set of program instructions, written in C language, for carrying out the resilient session function in TELSERV (12).

As will now be apparent, the invention permits complete recovery from any failure in the link which occurs below the level of the telnet server 12, and permits resumption of an interrupted session at the stage achieved prior to the interruption, with full user authentication and access privilege. As a consequence, the length of time required to complete the initial and the reestablished session is only slightly longer than the time required to complete the original session if left uninterrupted. The additional time required after reestablishing the session is due to the initial authentication requirement once the link is reestablished. In this connection, it is noted that the preferred embodiment requires only the identification of the service requested and the user ID and password when the session is desired to be resumed, and is not dependent upon the identification of the physical location or network address from which the user is operating. Thus, the user may resume an interrupted session at a different workstation 26 on the same network from that at which the original session was inaugurated. Consequently, the service sessions are truly virtual in that there is no dedicated hardware site required to resume an interrupted session.

While the above provides a full and complete description of the preferred embodiment of the invention, various modifications, alternate constructions and equivalents will occur to those skilled in the art. For example, while the invention has been described with reference to a unix type structure for linking the application programs at the host with the telnet client, other structures or communication protocols may be employed, as desired. Therefore, the above should not be construed as limiting the invention, which is defined by the appended claims.

What is claimed is:

1. A method of conducting a resilient service session in a network system having a host system with a host computer, a plurality of host application programs for providing service routines, a host telnet server for supervising service requests, a communications protocol process for providing network transport services between the host telnet server and a network, and a plurality of telnet client sites each having a workstation and a communications protocol process for providing network transport services between the telnet client site and the host system, said method comprising the steps of:

(a) receiving a service request from a telnet client;

(b) establishing an end-to-end link between the requesting telnet client site and at least one application program;

(c) performing the service request as an upper half session and a lower half session, the upper half session involving said at least one host application program processing the service request and sending requests to the host telnet server, and the host telnet server establishing request control buffers for storing the requests received from the host application program, the lower half session involving those portions of the network system extending between the host telnet server and the requesting telnet client;

(d) detecting an interruption in the end-to-end link in the network system portions involved in the lower half session;

(e) continuing the upper half session so that the at least one host application program continues to process the service request and continues to send the requests to the host telnet server, and the host telnet server continues to queue the input/output requests sent from the host application program in the request control buffers until the end-to-end link is reestablished; and (f) sending the queued requests sent from the host application and stored in the request control buffers to the telnet client to resume the lower half session of the interrupted service session at the interrupted stage.

2. The method of claim 1 wherein said step (b) of establishing includes the step of performing a user authentication routine before performing the service request.

3. The method of claim 1 wherein said step (f) of resuming includes the step (i) of performing a user authentication routine prior to resuming the lower half session of the interrupted service request session.

4. The method of claim 3 wherein said step (c) of performing includes the step of establishing a tty for the service request; and wherein said step (i) of performing includes the step of comparing the identity of a tty identified by the telnet client with a list of ttys at the host site, and permitting the service session to resume if a match is found.

5. The method of claim 3 wherein said step (i) of performing includes the step of comparing a service request received from the telnet client with a list of interrupted service sessions at the host site, and permitting the service session to resume if a match is found and the user is authorized to access the service.

6. In a network system having a host system with a host computer, a plurality of host application programs for providing service routines, a host telnet server for supervising service requests, a communications protocol process for providing information transport services between the host telnet server and a network; and a plurality of telnet client sites each having a workstation and a communication protocol process for providing information transport services between the telnet client site and the host system; the host telnet server including means for receiving a service request from a telnet client, means responsive to receipt of a service request for establishing an end-to-end link between a requesting telnet client site and at least one host application program, and means for performing a service session involving the requesting telnet client and the at least one host application program; the improvement wherein said host telnet server includes means for functionally partitioning a service session into an upper half session involving the at least one host application program and the host telnet server and a lower half session involving those portions of the network system extending between the host telnet server and the requesting telnet client, means for detecting an interruption in the end-to-end link in the network system portion involved in the lower half session, means for continuing the upper half session until the end-to-end link is reestablished, and means for resuming the lower half session of the interrupted service session at the interrupted stage.

7. The invention of claim 6 wherein said host telnet server includes means for establishing request control buffers for host application requests, and means for queueing host application requests in the request control buffers until the end-to-end link is reestablished.

8. The invention of claim 7 wherein said host telnet server includes means for sending the queued host application requests to the telnet client when the lower half session of the interrupted service session is resumed.

9. The invention of claim 6 wherein said resuming means includes means for performing a user authentication routine prior to resuming the lower half session of the interrupted service session.

10. The invention of claim 9 wherein said host telnet server includes means for establishing a tty list for each service request; and wherein said means for performing a user authentication routine includes means for comparing the identity of a tty identified by the telnet client with said tty list, and means for permitting the service session to resume if a match is found.

11. The invention of claim 9 wherein said host telnet server includes means for establishing a first list of interrupted service sessions and a second list of authorized users for given service session types; and wherein said means for performing a user authentication routine includes means for comparing a user provided service request with said first list and a user provided identification with said second list, and means for permitting the service session to resume if a match is found in both lists.

12. An apparatus for conducting a resilient service session in a network system having a host system with a host computer, a plurality of host application programs for providing service routines, a host telnet server for supervising service requests, a communications protocol process for providing network transport services between the host telnet server and a network, and a plurality of telnet client sites each having a workstation and a communications protocol process for providing network transport services between the telnet client site and the host system, said apparatus comprising:

a first portion configured to receive a service request from a telnet client;

a second portion configured to establish an end-to-end link between the requesting telnet client site and at least one application program;

a third portion configured to perform the service request as an upper half session and a lower half session, the upper half session involving said at least one host application program processing the service request and sending requests to the host telnet server, and the host telnet server establishing request control buffers for storing the requests received from the host application program, the lower half session involving those portions of the network system extending between the host telnet server and the requesting telnet client;

a fourth portion configured to detect an interruption in the end-to-end link in the network system portions involved in the lower half session;

a fifth portion configured to continue the upper half session so that the at least one host application program continues to process the service request and continues to send the requests to the host telnet server, and the host telnet server continues to queue the input/output requests sent from the host application program in the request control buffers until the end-to-end link is reestablished; and a sixth portion configured to send the queued host application requests sent from the host application and stored in the request control buffers to the telnet client to resume the lower half session of the interrupted service session at the interrupted stage.

13. The apparatus of claim 12 wherein said second portion includes an eighth portion configured to perform a user authentication routine.

14. The apparatus of claim 12 wherein said sixth portion further includes a ninth portion configured to perform a user authentication routine prior to resuming the lower half session of the interrupted service request and a tenth portion configured to send queued host application requests to the telnet client.

15. The apparatus of claim 12 wherein said eighth portion further includes an eleventh portion configured to establish a tty for the service request, a twelfth portion configured to compare the identity of a tty identified by the telnet client with a list of ttys at the host site, a thirteenth portion configured to compare a service request received from the telnet client with a list of interrupted service sessions at the host site, and a fourteenth portion configured to permit the service session to resume if a match is found.

16. A computer program product including:
a computer usable medium having a computer readable code embodied therein for conducting a resilient service session in a network system having a host system with a host computer, a plurality of host application programs for providing service routines, a host telnet server for supervising service requests, a communications protocol process for providing network transport services between the host telnet server and a network, and a plurality of telnet client sites each having a workstation and a communications protocol process for providing network transport services between the telnet client site and the host system, the computer program product comprising a first computer readable program code device configured to cause a computer to effect receiving a service request from a telnet client;

a second computer readable program code device configured to cause a computer to effect establishing an end-to-end link between the requesting telnet client site and at least one application program;

a third computer readable program code device configured to cause a computer to effect performing the service request as an upper half session and a lower half session, the upper half session involving said at least one host application program processing the service request and sending requests to the host telnet server, and the host telnet server establishing request control buffers for storing the requests received from the host application program, the lower half session involving those portions of the network system extending between the host telnet server and the requesting telnet client;

a fourth computer readable program code device configured to cause a computer to effect detecting an interruption in the end-to-end link in the network system portions involved in the lower half session;

a fifth computer readable program code device configured to cause a computer to effect continuation of the upper half session so that the at least one host application program continues to process the service request and continues to send the requests to the host telnet server, and the host telnet server continues to queue the request sent from the host application program in the request control buffers until the end-to-end link is reestablished; and a sixth computer readable program code device configured to cause a computer to effect sending the queued host application requests sent from the host application and stored in the request control buffers to the telnet client to resume the lower half session of the interrupted service session at the interrupted stage.

17. The computer program product of claim 16 wherein said second computer readable program code device further includes a seventh computer readable program code device configured to effect performing a user authentication routine.

18. The computer program product of claim 17 wherein said seventh computer readable program code device further includes an eleventh computer readable program code device configured to establish a tty for the service request, a twelfth computer readable program code device configured to compare the identity of a tty identified by the telnet client with a list of ttys at the host site, a thirteenth computer readable program code device configured to compare a service request received from the telnet client with a list of interrupted service sessions at the host site, and a fourteenth computer readable program code device configured to permit the service session to resume if a match is found.

19. The computer program product of claim 16 wherein said sixth computer readable program code device further includes a ninth computer readable program code device configured to perform a user authentication routine prior to a resumption of the lower half session of the interrupted service request and a tenth computer readable program code device configured to send queued host application requests to the telnet client.

20. A method of conducting a resilient service session in a network system when a network interruption occurs, the network system including a host computer for processing a host application program in communication with a host server, and the host server in communication with the client site, the method comprising the steps of:

detecting an interruption in the communication in a lower half session between the host server and the client site; and continuing an upper half session between the host application program and the host server, so that the host application program continues to process a service request and continues to send one or more requests to the host server, and the host server continues to queue the requests sent from the host application program in one or more requests control buffers until an end-end link between the host server and the client site is reestablished.

21. The method of claim 20 further including the step of:
sending the queued requests sent from the host application program and stored in the request control buffers to the client to resume the lower half session of the interrupted service session at the interrupted stage.

22. The method of claim 21, wherein said step of sending includes the step of:

performing a user authentication routine prior to resuming the lower half session of the interrupted service session.

23. The method of claim 22, wherein said step of performing includes the step of:

comparing a service request received from the client with a list of interrupted service sessions at the host site, and permitting the service session to resume if a match is found and the user is authorized to access the service.

* * * * *